US010203258B2

(12) United States Patent
Romo et al.

(10) Patent No.: US 10,203,258 B2
(45) Date of Patent: Feb. 12, 2019

(54) PRESSURE SENSOR DIAPHRAGM WITH OVERPRESSURE PROTECTION

(71) Applicant: Rosemount Inc., Shakopee, MN (US)

(72) Inventors: Mark George Romo, Eden Prairie, MN (US); Nicholas Edward Meyer, Chaska, MN (US)

(73) Assignee: ROSEMOUNT INC., Shakopee, MN (US)

( * ) Notice: Subject to any disclaimer, the term of this patent is extended or adjusted under 35 U.S.C. 154(b) by 243 days.

(21) Appl. No.: 15/275,688

(22) Filed: Sep. 26, 2016

(65) Prior Publication Data

US 2018/0087988 A1    Mar. 29, 2018

(51) Int. Cl.
*G01L 19/06* (2006.01)
*G01L 9/00* (2006.01)

(52) U.S. Cl.
CPC ........ *G01L 19/0618* (2013.01); *G01L 9/0047* (2013.01); *G01L 9/0054* (2013.01)

(58) Field of Classification Search
CPC ......... G01L 7/08; G01L 7/082; G01L 9/0055; G01L 19/0618; G01L 9/0047
USPC .......................................................... 73/715
See application file for complete search history.

(56) References Cited

U.S. PATENT DOCUMENTS

| 4,163,964 A | 8/1979 | De Filippis |
| 4,364,276 A | 12/1982 | Shimazoe et al. |
| 4,535,851 A | 8/1985 | Kirkpatrick |
| 4,703,664 A | 11/1987 | Kirkpatrick |
| 4,782,319 A | 11/1988 | Dell'Acqua et al. |
| 4,852,581 A * | 8/1989 | Frank ............... G01L 1/2287 600/485 |
| 5,058,435 A | 10/1991 | Terry |
| 5,062,302 A | 11/1991 | Petersen et al. |
| 5,184,515 A | 2/1993 | Terry |
| 5,333,504 A | 8/1994 | Lutz et al. |
| 5,585,311 A | 12/1996 | Ko |

(Continued)

FOREIGN PATENT DOCUMENTS

| DE | 3703697 | 8/1987 |
| DE | 69321717 | 5/1999 |

(Continued)

OTHER PUBLICATIONS

Notification of Transmittal of the International Search Report and the Written Opinion of the International Searching Authority from PCT/US2016/053890, dated Jun. 1, 2017.

(Continued)

*Primary Examiner* — John Fitzgerald
*Assistant Examiner* — Jean Morello
(74) *Attorney, Agent, or Firm* — Westman, Champlin & Koehler, P.A.

(57) ABSTRACT

A pressure sensor includes a base having at least one high-pressure contact portion and a diaphragm positioned over the base and having an external top surface facing away from the base and internal surfaces facing the base. The internal surfaces comprising a raised perimeter surrounding an interior, a raised central boss within the interior, and a raised boss arm contiguous with and extending from the raised perimeter toward the interior. At least one of the raised boss arm and raised central boss are aligned with and contact a high-pressure contact portion of the base during an over-pressure event.

9 Claims, 8 Drawing Sheets

(56) References Cited

U.S. PATENT DOCUMENTS

| | | | |
|---|---|---|---|
| 6,647,794 | B1 | 11/2003 | Nelson et al. |
| 6,883,380 | B2 | 4/2005 | Romo |
| 7,240,558 | B2 | 7/2007 | Ernsberger et al. |
| 8,276,458 | B2 | 10/2012 | Hedtke |
| 9,403,677 | B2 | 8/2016 | Doelle |
| 9,719,872 | B2 | 8/2017 | Willcox et al. |
| 10,060,813 | B2 | 8/2018 | Willcox et al. |
| 2002/0017143 | A1 | 2/2002 | Burczyk |
| 2003/0074973 | A1 | 4/2003 | Kurtz et al. |
| 2003/0107096 | A1 | 6/2003 | Kurtz et al. |
| 2006/0086188 | A1 | 4/2006 | Avramescu |
| 2008/0160659 | A1 | 7/2008 | Craddock et al. |
| 2013/0087864 | A1* | 4/2013 | Ten Have ........... B81C 1/00158 257/419 |
| 2013/0118265 | A1 | 5/2013 | Besling et al. |
| 2015/0166327 | A1 | 6/2015 | Doelle |
| 2015/0192487 | A1 | 7/2015 | Belov et al. |
| 2016/0146687 | A1 | 5/2016 | Longu |
| 2016/0332866 | A1* | 11/2016 | Brosh ................. B81C 1/00626 |
| 2018/0087988 | A1 | 3/2018 | Romo et al. |

FOREIGN PATENT DOCUMENTS

| | | |
|---|---|---|
| DE | 10 2009 031 705 | 1/2011 |
| DE | 10 2010 040 373 | 3/2012 |
| EP | 2 891 871 | 7/2015 |
| FR | 3007134 | 12/2014 |

OTHER PUBLICATIONS

Notification of Transmittal of the International Search Report and the Written Opinion of the International Searching Authority from PCT/US2016/049187 dated Dec. 13, 2016.

Communication from European Patent Application No. 16763147.2, dated May 11, 2018.

Notification of Transmittal of the International Search Report and the Written Opinion of the International Searching Authority from PCT/US2017/023309, dated Jun. 21, 2017.

* cited by examiner

PRESSURE SENSOR DIAPHRAGM WITH OVERPRESSURE PROTECTION

FIELD

The present disclosure relates to pressure sensors. In particular, the present disclosure relates to pressure sensors with over-pressure protection.

BACKGROUND

In many pressure sensors, a flexible diaphragm moves relative to a base in response to pressure applied to the top of the diaphragm. Diaphragms that provide repeatable monotonic movement in response to applied pressures are preferred. As a result, crystalline diaphragms, such as those made from crystalline silicon have been widely adopted since they provide monotonic movement in response to applied pressures and are generally free of hysteretic effects. Unfortunately, sensors with such crystalline structures have limited over-pressure capability and excessive pressure on the sensor diaphragm can cause large tensile stresses that exceed the crystalline structure's maximum fracture strength. Failures in such sensors tend to be catastrophic often resulting in an entirely shattered structure.

The discussion above is merely provided for general background information and is not intended to be used as an aid in determining the scope of the claimed subject matter. The claimed subject matter is not limited to implementations that solve any or all disadvantages noted in the background.

SUMMARY

A pressure sensor includes a base having at least one high-pressure contact portion and a diaphragm positioned over the base and having an external top surface facing away from the base and internal surfaces facing the base. The internal surfaces comprising a raised perimeter surrounding an interior, a raised central boss within the interior, and a raised boss arm contiguous with and extending from the raised perimeter toward the interior. At least one of the raised boss arm and raised central boss are aligned with and contact a high-pressure contact portion of the base during an over-pressure event.

In a further embodiment, a sensor includes a base and a diaphragm having a raised perimeter mounted on the base. The diaphragm also includes a raised central boss within an interior of the raised perimeter, at least one recess between the raised central boss and the raised perimeter and at least one raised boss arm contiguous with and extending from the raised central boss.

In a still further embodiment, a pressure sensor includes a base and a diaphragm mounted on the base. The diaphragm includes a first recess defining a first internal corner and a second recess defining a second internal corner. The first internal corner is separated from the second internal corner by a raised boss having a width equal to the distance between the first internal corner and the second internal corner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figures 1, 2:
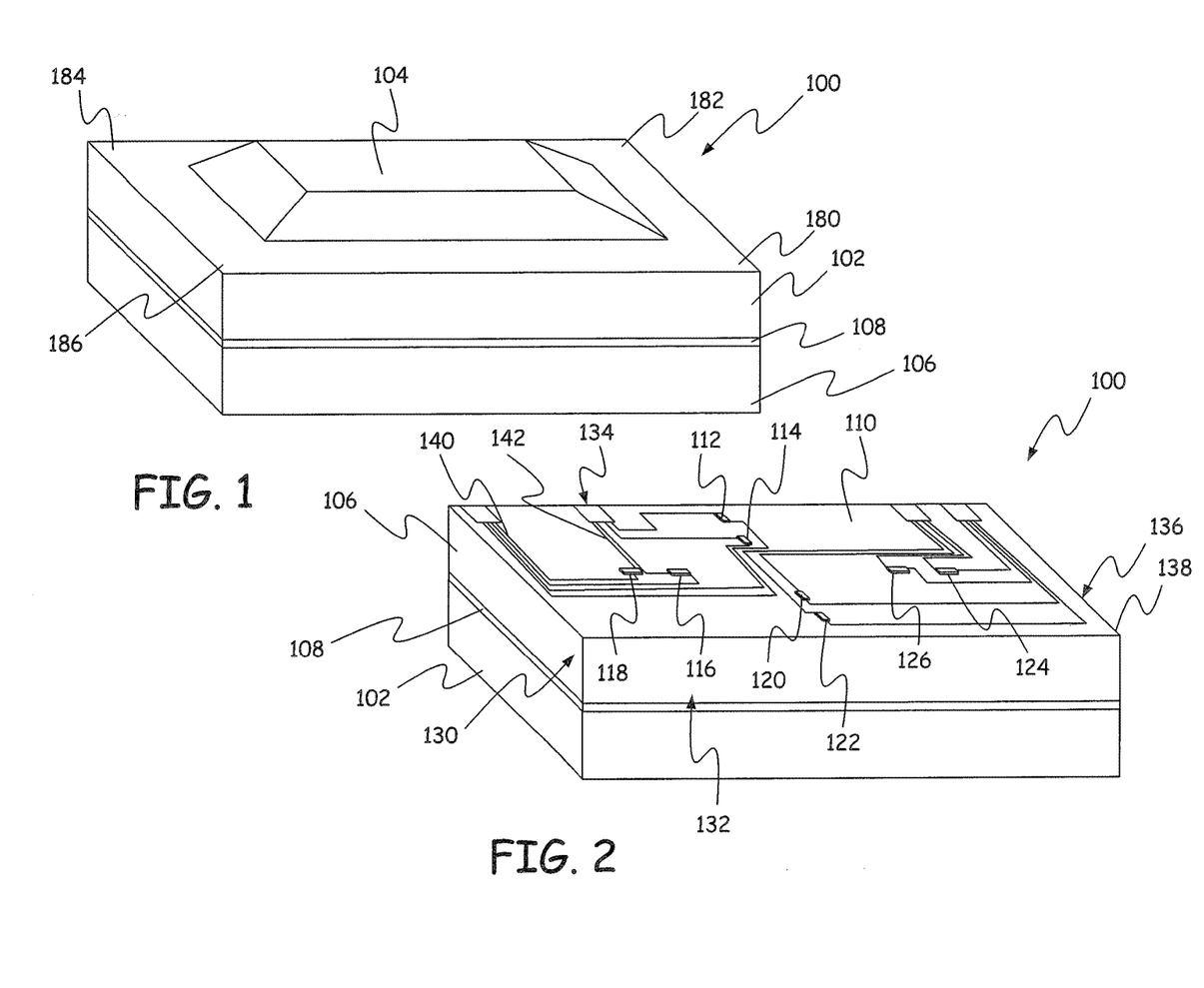
FIG. 1 is a bottom perspective view of an embodiment of a pressure sensor.
FIG. 2 is a top perspective view of the pressure sensor of FIG. 1.

FIG. 1 provides a bottom perspective view and FIG. 2 provides a top perspective view of a pressure sensor 100 in accordance with one embodiment. In FIG. 1, pressure sensor 100 includes a base 102 having a pedestal or support 104 that is centrally located and can be connected to a housing that defines a chamber around pressure sensor 100. A diaphragm 106 is positioned above base 102 and is mounted to base 102 by a bonding layer 108. Along a top surface 110 of diaphragm 106, one or more sensing elements, such as sensing elements 112, 114, 116, 118, 120, 122, 124 and 126 are positioned to sense flexing of diaphragm 106 and/or changes in diaphragm 106 as it flexes in response to pressures applied to top surface 110 and side surfaces 130, 132, 134 and 136, which extend from top surface 110 along a closed perimeter 138 around top surface 110. Thus, side surfaces extend around the entirety of top surface 110 such that diaphragm 106 is isolated from contact with other structures and such that fluid around diaphragm 106 can apply lateral hydrostatic loading forces on each of the sides extending down from top surface 110 along the entirety of the closed perimeter 138 around top surface 110.

Sensing elements 112, 114, 116, 118, 120, 122, 124 and 126 each provide an output based on changes to diaphragm 106. In some embodiments, this output is an electrical characteristic such as a resistance or capacitance that can be sensed by applying an electrical current and/or voltage through electrical traces such as electrical traces 140 and 142 connected to sensing element 118. For example, when the sensing elements are piezoresistive elements, a current is passed through the piezoresistive element using the electrical traces and the resistance of the piezoresistive sensing element is measured based on the current or voltage output of the piezoresistive sensing element. Although piezoresistive sensing elements have been discussed, other examples of sensing elements include capacitance, optical displacement sensing, piezoelectric, and resonance sensing are possible.

In accordance with some embodiments, diaphragm 106 and base 102 are both formed from isotropically or anisotropically etched crystalline silicon wafers that are patterned to provide certain features as described below and then diced or cut from the wafers. In other embodiments, diaphragm 106 is form of a poly-crystalline material or amorphous material. Further, in other embodiments, diaphragm 106 is made of alumina or quartz, a single element metal, a metal alloy of two or more elements, or is made of multiple materials.

Figure 3:
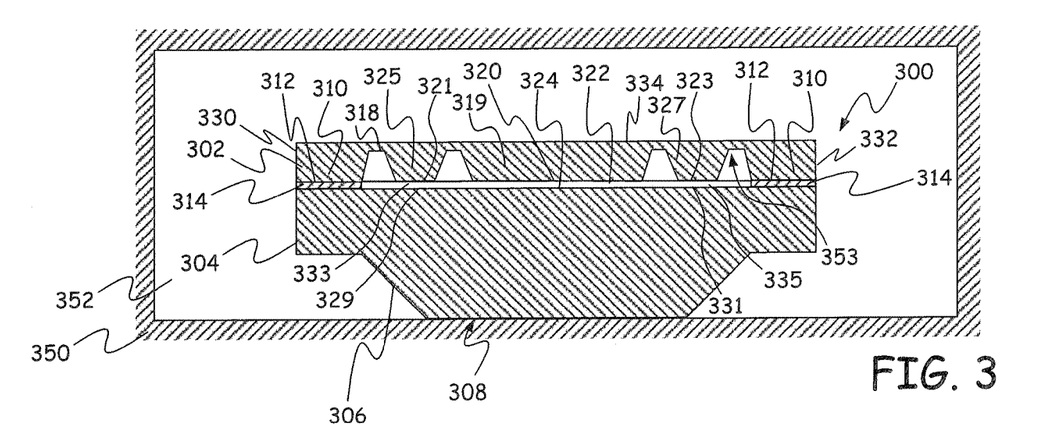
FIG. 3 is a sectional side view of a pressure sensor in accordance with one embodiment.
Figure 4:
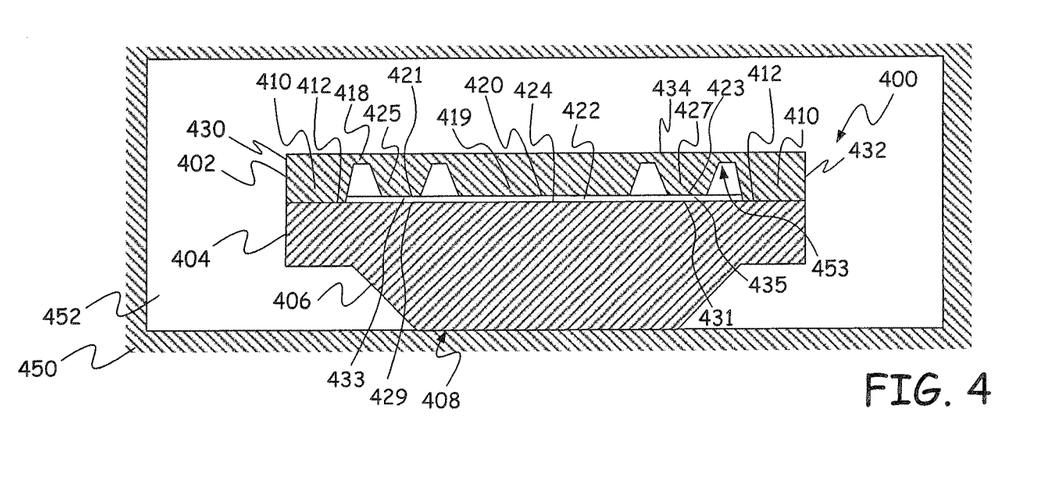
FIG. 4 is a sectional side view of a pressure sensor in accordance with a second embodiment.

FIGS. 3 and 4 provide sectional views of two pressure sensors 300 and 400, respectively, which represent two different embodiments. In FIG. 3, pressure sensor 300 includes a diaphragm 302 positioned over a base 304. Sensing elements are present on a top external surface 334 of diaphragm 302 but are too small to be seen in FIG. 3. In accordance with some embodiments, diaphragm 302 and base 304 are both formed from isotropically or anisotropically etched silicon wafers that are patterned to provide certain features as described below and then diced or cut from the wafers. In other embodiments, other materials, like those discussed above, are used for diaphragm 302 and/or base 304. Base 304 has an etched pedestal 306, which acts as a stress isolation structure to keep package and mounting induced stresses from affecting the operation of pressure sensor 300. A bottom surface 308 of pedestal 306 mounts to a housing 350 such that diaphragm 302 is isolated from contact with other structures outside of pressure sensor 300 and is surrounded by fluid within a chamber 352 defined by housing 350. In other embodiments, pedestal 306 is not present and corners 180, 182, 184 and 186 (FIG. 1) of the bottom surface of base 304 are mounted to housing 350 using "dots" of Room Temperature Vulcanizing (RTV) adhesive.

Diaphragm 302 has top external surface 334 facing away from base 304, internal surfaces 353 and side surfaces that extend from top surface 334 toward base 304, such as side surfaces 330 and 332, along a closed perimeter around top surface 334. Thus, side surfaces extend around the entirety of top surface 334 such that diaphragm 302 is isolated from contact with other structures and such that fluid around diaphragm 302 can apply lateral hydrostatic pressure on each of the sides extending down from top surface 334 along the entirety of the closed perimeter around top surface 334.

Internal surfaces 353 include a central boss 319, boss arms 325 and 327, and a raised perimeter that includes mounting portion or bonding portion 310 having a mounting surface 312. Mounting surface 312 is joined to base 304 by bonding layer 314. In one embodiment, bonding layer 314 is a high temperature glass-based bonding material often referred to as "frit". Bonding or mounting portion 310 protrudes toward base 304 relative to an interior portion 318 of the diaphragm 302.

High-pressure contact portions 320, 321 and 323 of bosses 319, 325 and 327, respectively, protrude toward base 304 from interior portion 318 and are separated from high-pressure contact portions 324, 329, and 331 of base 304 by respective gaps 322, 333, and 335. Across a first range of pressures, high-pressure contact portions 320, 321 and 323 do not contact base 304 and sensing elements on diaphragm 302 provide a monotonic first rate of change with changes in applied pressures to the sides 330, 332 and top 334 of diaphragm 302. Above a pressure threshold, one or more of high-pressure contact portions 320, 321 and 323 contact base 304 at one or more of high-pressure contact points 324, 329 and 331, respectively. After this contact, portions of diaphragm 302 act as secondary deflectable regions and continue to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 302 and base 304 in some embodiments.

In accordance with some embodiments, the thicknesses of gaps 322, 333 and 335 are controlled by the thickness of bonding layer 314 such that high-pressure contact portions 320, 321 and 323 are level with exterior surface 312 of mounting portion 310.

Pressure sensor 400 of FIG. 4 includes a diaphragm 402 positioned over a base 404. Sensing elements are positioned on top external surface 434 of diaphragm 402 but are too small to be seen in FIG. 4. In accordance with some embodiments, diaphragm 402 and base 404 are both formed from isotropically or anisotropically etched silicon wafers that are patterned to provide certain features as described below and then diced or cut from the wafers. In other embodiments, other materials, like those discussed above, are used for diaphragm 402 and/or base 404. Base 404 has an etched pedestal 406, which acts as a stress isolation structure to keep package and mounting induced stresses from affecting the operation of pressure sensor 400. A bottom surface 408 of pedestal 406 mounts to a housing 450 such that diaphragm 402 is isolated from contact with other structures outside of pressure sensor 400 and is surrounded by fluid within a chamber 452 defined by housing 450.

Diaphragm 402 has top external surface 434 facing away from base 404, an internal surface 453 facing base 404, and side surfaces that extend from top surface 434 toward base 404, such as side surfaces 430 and 432, along a closed perimeter around top surface 434. Thus, side surfaces extend around the entirety of top surface 434 such that diaphragm 402 is isolated from contact with other structures and such that fluid around diaphragm 402 can apply lateral hydrostatic pressure on each of the sides extending down from top surface 434 along the entirety of the closed perimeter around top surface 434.

Internal surfaces 453 include a central boss 419, boss arms 425 and 427, and a raised perimeter that includes mounting portion or bonding portion 410 having a mounting surface 412. Mounting surface 412 is joined to base 404. Bonding or mounting portions 410 protrude toward base 404 relative to an interior portion 418 of the diaphragm 402.

High-pressure contact portions 420, 421 and 423 of bosses 419, 425 and 427, respectively, protrude toward base 404 from interior portion 418 and are separated from high-pressure contact portions 424, 429, and 431 of base 404 by respective gaps 422, 433, and 435. Across a first range of pressures, high-pressure contact portions 420, 421 and 423 do not contact base 404 and sensing elements on diaphragm 402 provide a monotonic first rate of change with changes in applied pressures to the sides 430, 432 and top surface 434 of diaphragm 402. Above a pressure threshold, one or more of high-pressure contact portions 420, 421 and 423 contact base 404 at one or more of high-pressure contact portions 424, 429 and 431, respectively. After this contact, portions of diaphragm 402 act as secondary deflectable regions and continue to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 402 and base 404 in some embodiments.

In pressure sensor 400 of FIG. 4, bonding layers 314 and 316 in sensor 300 of FIG. 3 have been removed and diaphragm 402, which has shortened bosses 419, 425 and 427, is used in place of diaphragm 302. High-pressure contact portions 420, 421, and 423 do not protrude from interior portion 418 of diaphragm 402 as much as high-pressure contact portions 320, 321 and 323 of FIG. 3 protrude from interior portion 318. As a result, high-pressure contact portions 420, 421 and 423 are recessed relative to mounting surface 412 so as to provide gaps 422, 433 and 435 between high-pressure contact portions 424, 429 and 431 of base 404 and high-pressure contact portions 420, 421 and 423 of diaphragm 402.

In the embodiment of FIG. 4, diaphragm 402 is bonded to base 404 through a process such as a fusion bond, an anodic bond, a silicon alloy bond or a metal solder bond, for example. For embodiments that use an anodic bond, the diaphragm is made from silicon while the base is made from an ionic alkali glass.

FIGS. 5-9 provide bottom views of various diaphragms that can be used as diaphragm 106 in the various embodiments.

Figure 5:
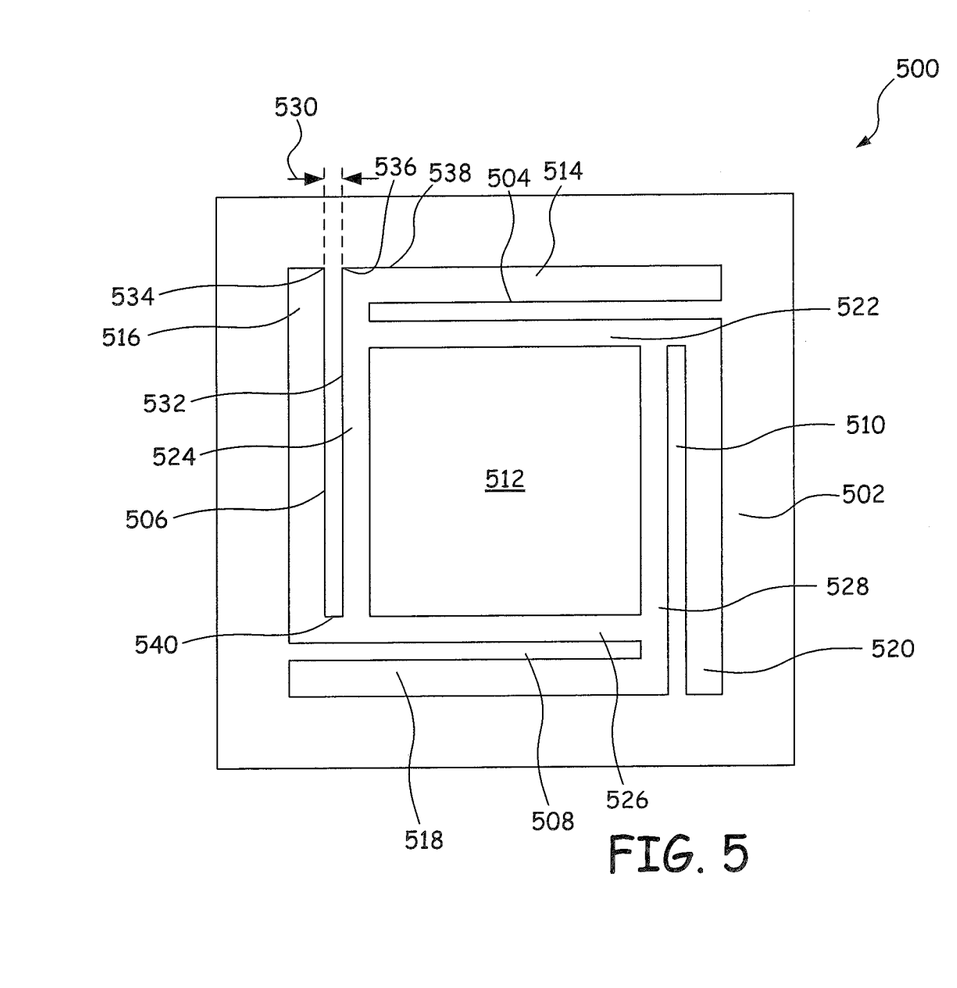
FIG. 5 is a bottom view of a diaphragm in accordance with a first embodiment.

FIG. 5 is a bottom view of a diaphragm 500, which includes a raised perimeter 502 that extends around diaphragm 500 and provides mounting or bonding portions, such as mounting portions 310, and 410 of FIGS. 3 and 4, for mounting the diaphragm onto the base. Four raised boss arms 504, 506, 508 and 510 are contiguous with and extend from respective portions of perimeter 502 toward an interior of diaphragm 500. In particular, each of boss arms 504, 506, 508 and 510 extend inward from a respective internal side of raised perimeter 502. A raised central boss 512 is centered on the center of diaphragm 500. Perimeter 502, raised boss arms 504, 506, 508 and 510 and raised central boss 512 are defined by recesses 514, 516, 518, 520, 522, 524, 526 and 528. At least one of the recesses is between central boss 512 and perimeter 502. Each boss arm 504, 506, 508 and 510 has a width 530, which provides a measure of the distance across the boss arm along a direction that is normal to a side edge of the boss arm, such as side edge 532 of boss arm 506.

Where each boss arm extends from perimeter 502, two recesses form respective internal corners, such as internal corners 534 and 536 formed by recesses 516 and 524 for boss arm 506. Each internal corner is formed from a side of a boss arm and from a respective portion of perimeter 502. For example, internal corner 536 is formed from side 532 of boss arm 506 and from portion 538 of perimeter 502. An internal corner as used herein is a corner in which the two sides that define the corner are less than 180° apart as measured across the recess that separates the sides. In FIG. 5, each of the boss arms 504, 506, 508 and 510 has two respective internal corners at the location where the boss arms are contiguous with and extend from perimeter 502. Each pair of internal corners is separated by a distance equal to the width of the boss arm. Thus, internal corners 534 and 536 are separated by boss arm 506 and a distance equal to width 530 of boss arm 506. In FIG. 5, each of boss arms 504, 506, 508 and 510 have an end, such as end 540 of boss arm 506, that is separated from other raised features.

Because the boss arms are each contiguous with and extend from perimeter 502, none of the recesses in diaphragm 500 extend from a perimeter on one side of the diaphragm to another portion of the perimeter on the opposite side of the diaphragm. For example, recesses 514 and 522 extend from a first side of perimeter 502 but end at boss arm 506. If recesses 514 and 522 were lengthened to extend through boss arm 506 thereby shortening boss arm 506 and forming a new island boss between recesses 514 and 522, the island boss would have stress concentration points that would be much higher than the stress concentration points of diaphragm 500 shown in FIG. 5. Thus, diaphragm 500 provides a diaphragm with lower stress concentration points because the boss arms are contiguous with and extend from raised perimeter 502.

Figure 6:
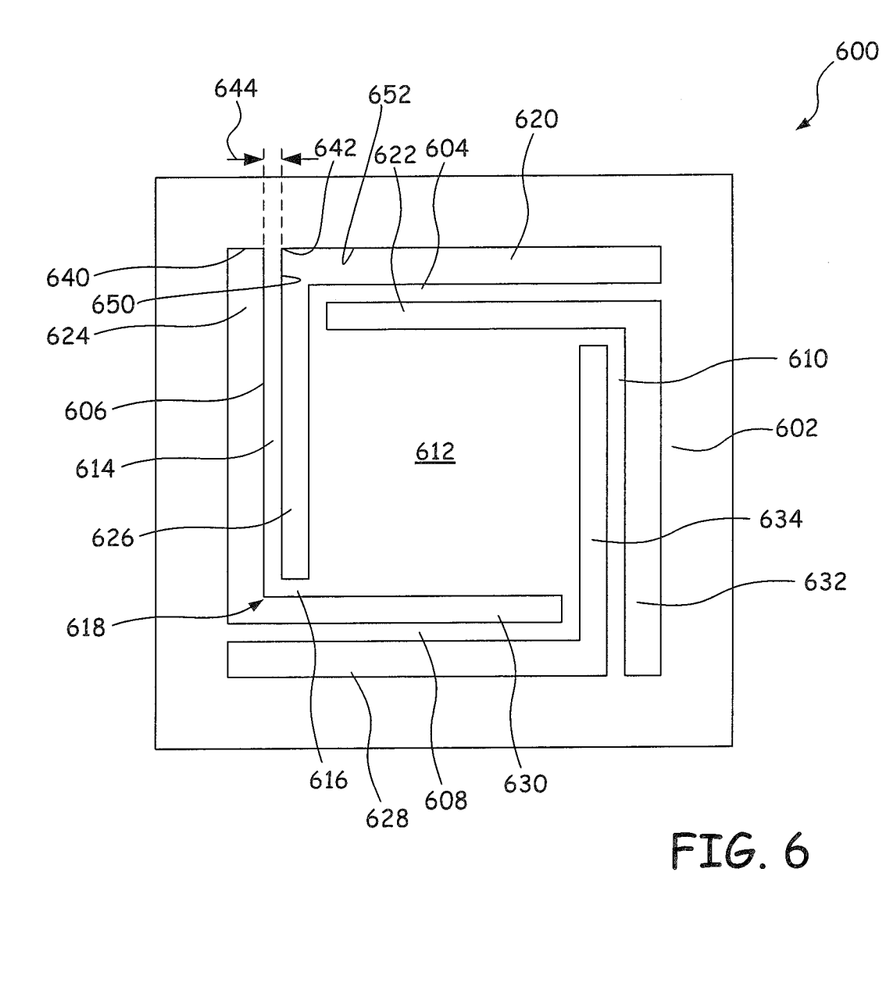
FIG. 6 is a bottom view of a diaphragm in accordance with a second embodiment.

FIG. 6 provides a bottom view of a diaphragm 600 under a second embodiment. Diaphragm 600 includes raised perimeter 602, raised boss arms 604, 606, 608 and 610 and raised central boss 612. The raised boss arms and the raised central boss are each positioned over and aligned with high-pressure contact areas on the base as shown in FIGS. 3 and 4. Each of boss arms 604, 606, 608 and 610 include two legs with one leg contiguous and extending from perimeter 602 toward an interior of diaphragm 600 and another leg contiguous with and extending from central boss 612 with a turn between the two legs. For example, boss arm 606 includes legs 614 and 616 with turn 618 between the two legs. The legs of boss arms 604, 606, 608 and 610 extend from respective internal sides or raised perimeter 602. In this context, central boss 612 acts as another raised feature that the boss arms are contiguous with.

Boss arms 604, 606, 608 and 610 and central boss 612 are defined by a collection of recesses 620, 622, 624, 626, 628, 630, 632 and 634. As shown in FIG. 6, at least one of the recesses is positioned between central boss 612 and perimeter 602.

The recesses define two internal corners for each boss arm. For example, recess 624 defines internal corner 640 and recess 626 defines internal corner 642. Each internal corner is formed from a side of a boss arm and from a respective portion of perimeter 602. For example, internal corner 642 is formed from side 650 of boss arm 606 and from portion 652 of perimeter 602. An internal corner as used herein is a corner in which the two sides that define the corner are less than 180° apart as measured across the recess that separates the sides. In FIG. 6, each of the boss arms 604, 606, 608 and 610 has two respective internal corners at the location where the boss arms are contiguous with and extend from perimeter 602. Each pair of internal corners is separated by a distance equal to the width of the boss arm. Thus, internal corners 640 and 642 are separated by boss arm 606 and a distance equal to width 644 of boss arm 606.

Figure 7:
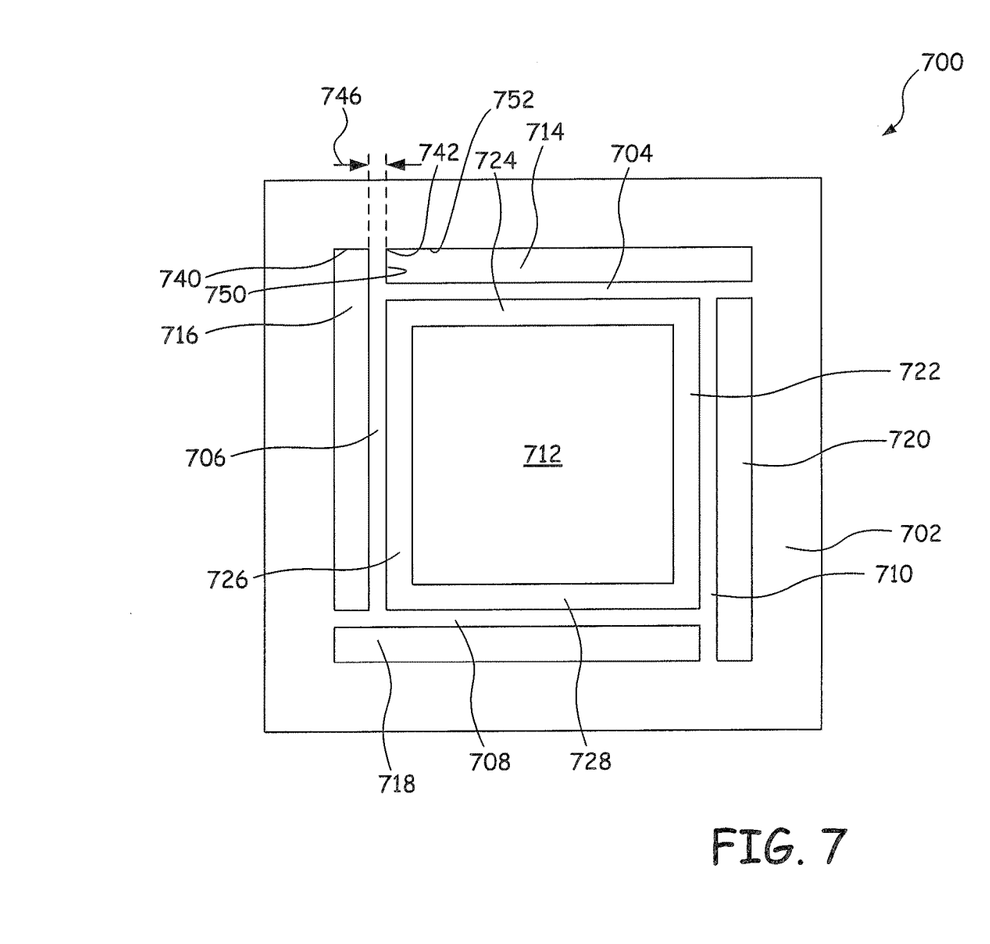
FIG. 7 a bottom view of a diaphragm in accordance with a third embodiment.

FIG. 7 is a bottom view of a diaphragm 700 representing a third embodiment. Diaphragm 700 includes a raised perimeter 702, raised boss arms 704, 706, 708 and 710 and raised central boss 712. The raised boss arms and the raised central boss are each positioned over and aligned with high-pressure contact areas on the base as shown in FIGS. 3 and 4. Each of boss arms 704, 706, 708 and 710 is contiguous with and extends from perimeter 702 toward an interior of diaphragm 700. In particular, each of boss arms 704, 706, 708 and 710 extend inward from a respective internal side of raised perimeter 702. Further, each of boss arms 704, 706, 708 and 710 intersect with another of the boss arms. For example, boss arms 704 intersect with boss arm 706 and boss arm 706 intersects with boss arm 708. Thus, all of the boss arms are contiguous with each other. In this context each of the boss arms is another raised feature that one of the boss arms is contiguous with.

The boss arms and the central boss 712 are defined by recesses, such as recesses 714, 716, 718, 720, 722, 724, 726 and 728. As shown in FIG. 7, at least one of the recesses is between central boss 712 and raised perimeter 702. The recesses define two internal corners for each of the boss arms 704, 706, 708 and 710 at the location where the boss arms extend from raised perimeter 702. For example, recesses 716 and 714 define internal corners 740 and 742, respectively for boss arm 706. Each internal corner is formed from a side of a boss arm and from a respective portion of perimeter 702. For example, internal corner 742 is formed from side 750 of boss arm 706 and from portion 752 of perimeter 702. An internal corner as used herein is a corner in which the two sides that define the corner are less than 180° apart as measured across the recess that separates the sides. In FIG. 7, each of the boss arms 704, 706, 708 and 710 has two respective internal corners at the location where the boss arms are contiguous with and extend from perimeter 702. Each pair of internal corners is separated by a distance equal to the width of the boss arm. Thus, internal corners 740 and 742 are separated by boss arm 706 and a distance equal to width 746 of boss arm 706.

Figure 8:
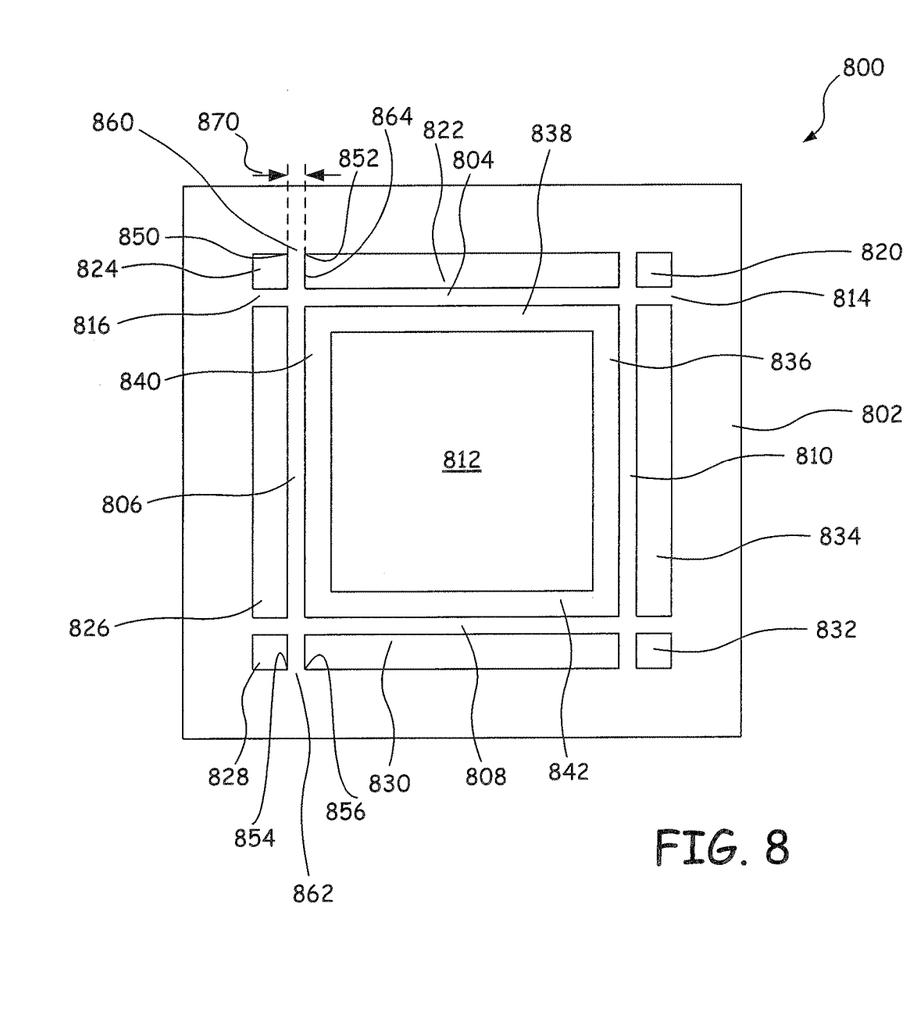
FIG. 8 is a bottom view of a diaphragm in accordance with a fourth embodiment.

FIG. 8 provides a bottom view of a diaphragm 800 in accordance with a further embodiment. Diaphragm 800 includes raised perimeter 802, raised boss arms 804, 806, 808 and 810 and raised central boss 812. The raised boss arms and the raised central boss are each positioned over and aligned with high-pressure contact areas on the base as shown in FIGS. 3 and 4. Each of boss arms 804, 806, 808 and 810 extend from and are contiguous with two separate portions of raised perimeter 802. For example, boss arm 804 is contiguous with and extends from portion 814 of raised perimeter 802 and from portion 816 of raised perimeter 802 on an opposing internal side of perimeter 802. In addition, each of the boss arms intersects two other boss arms and is therefore contiguous with two additional boss arms. For example, boss arm 806 intersects and is contiguous with boss arms 804 and 808. In this context the two boss arms that a boss arm intersects are other raised features that the boss arm is contiguous with.

Boss arms 804, 806, 808 and 810 and central boss 812 are defined by recesses 820, 822, 824, 826, 828, 830, 832, 834, 836, 838, 840 and 842. As shown in FIG. 8, at least one of these recesses is between central boss 812 and raised perimeter 802.

Where each of the boss arms extend from raised perimeter 802, the recesses that define the boss arms also define two internal angles. For example, recess 824 defines internal angle 850 and recess 822 defines internal angle 852 for boss arm 806 at portion 860 of raised perimeter 802 while recess 828 defines internal angle 854 and recess 830 defines internal angle 856 for boss arm 806 at a second portion 862 of raised perimeter 802. Each internal corner is formed from a side of a boss arm and from a respective portion of perimeter 802. For example, internal corner 852 is formed from side 864 of boss arm 806 and from portion 860 of perimeter 802. An internal corner as used herein is a corner in which the two sides that define the corner are less than 180° apart as measured across the recess that separates the sides. In FIG. 8, each of the boss arms 804, 806, 808 and 810 has two pairs of respective internal corners, with each pair at a location where the boss arms are contiguous with and extend from perimeter 802. Each pair of internal corners is separated by a distance equal to the width of the boss arm. Thus, internal corners 850 and 852 are separated by boss arm 806 and a distance equal to width 870 of boss arm 806.

Figure 9:
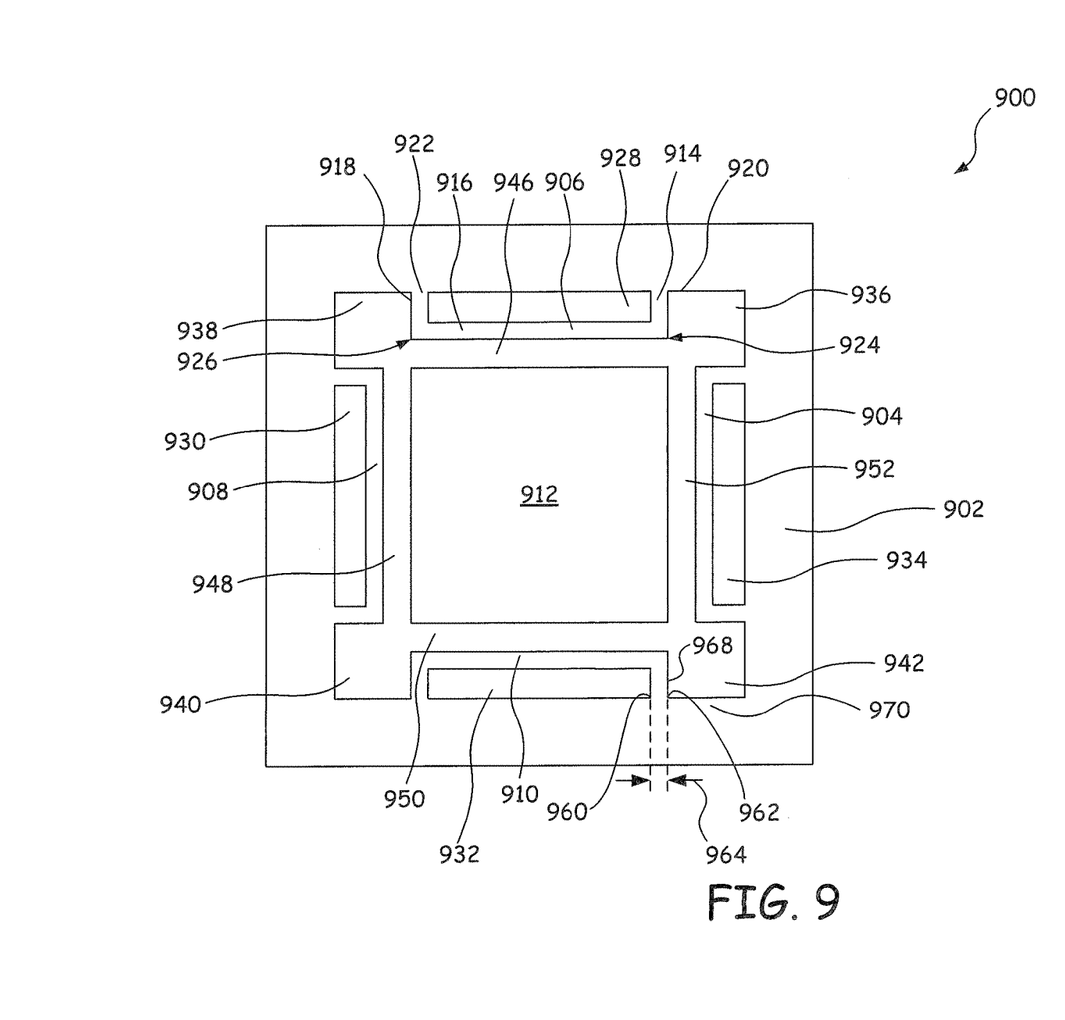
FIG. 9 is a bottom view of a diaphragm in accordance with a fifth embodiment.

FIG. 9 provides a bottom view of a diaphragm 900 under a further embodiment. Diaphragm 900 includes raised perimeter 902, raised boss arms 904, 906, 908 and 910 and raised central boss 912. The raised boss arms and the raised central boss are each positioned over and aligned with high-pressure contact areas on the base as shown in FIGS. 3 and 4. Each of the boss arms includes three legs, such as legs 914, 916 and 918 of boss arm 906. Leg 914 extends from and is contiguous with a first portion 920 of raised perimeter 902, leg 918 is contiguous with and extends from a second portion 922 of raised perimeter 902 and leg 916 connects legs 914 and 918. First portion 920 and second portion 922 are on a same internal side of raised perimeter 902. Each boss arm also includes two turns, such as turns 924 and 926 of boss arm 906 where turn 924 is between leg 914 and leg 916 and turn 926 is between leg 916 and leg 918. Boss arms 904, 906, 908 and 910 and central boss 912 are defined by a plurality of recesses 928, 930, 932, 934, 936, 938, 940, 942, 946, 948, 950 and 952. As shown in FIG. 9, at least one of the recesses is between central boss 912 and raised perimeter 902. At each location where a boss arm extends from raised perimeter 902, two recesses define two respective internal corners. For example, recess 932 defines internal corner 960 and recess 942 defines internal corner 962 for boss arm 910. Each internal corner is formed from a side of a boss arm and from a respective portion of perimeter 902. For example, internal corner 962 is formed from side 968 of boss arm 910 and from portion 970 of perimeter 902. An internal corner as used herein is a corner in which the two sides that define the corner are less than 180° apart as measured across the recess that separates the sides. In FIG. 9, each of the boss arms 904, 906, 908 and 910 has two pairs of respective internal corners, with each pair at a location where the boss arms are contiguous with and extend from perimeter 902. Each pair of internal corners is separated by a distance equal to the width of the boss arm. Thus, internal corners 960 and 962 are separated by boss arm 910 and a distance equal to width 964 of boss arm 910.

Although the exemplary diaphragms shown in FIGS. 5-9 include bosses with straight legs, in other embodiments, the boss arms may be curved and/or the central boss may be circular. In addition, although all of the bosses are shown as being at the same level as the raised perimeter, in other embodiments one or more of the bosses may be at different levels relative to the raised perimeter and in still further embodiments one or more of the bosses may be at different levels than the other bosses. In addition, the base can include raised contact areas that are at varied heights relative to each other.

Figure 10:
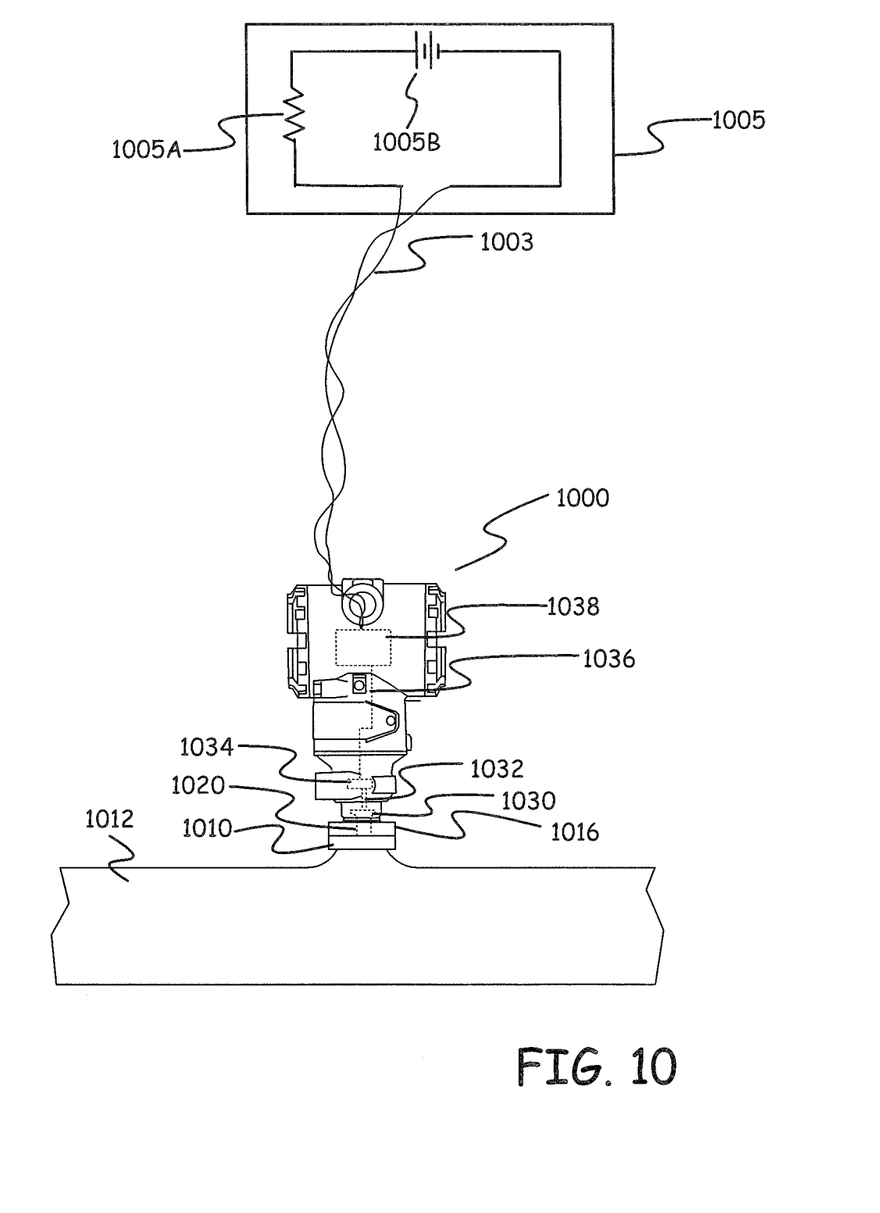
FIG. 10 is a simplified diagram of a portion of an industrial process control system in which embodiments may be utilized.

FIG. 10 is a perspective view of a portion of a process control system in which the pressure sensors described above are used in accordance with some embodiments. In FIG. 10, a process variable transmitter 1000 is mounted to a process coupling 1010 of a pipe section 1012 by a mounting member 1016.

Mounting member 1016 includes a bore 1020 which extends from process coupling 1010 to an isolation diaphragm assembly 1030. Isolation diaphragm assembly 1030 includes an isolation diaphragm that isolates the process fluid in pipe section 1012 from isolation fluid carried in isolation capillary 1032. Isolation capillary 1032 couples to a pressure sensor 1034, which takes the form of one of the pressure sensors described above. Sensor 1034 is configured to measure an absolute pressure (relative to vacuum) or a gage pressure (relative to atmospheric pressure) and provide an electrical output 1036 to transmitter circuitry 1038.

Transmitter circuitry 1038 communicates with a control room 1005 to provide one or more process variables to control room 1005, such as absolute pressure and gage pressure. Transmitter circuitry 1038 may communicate with control room 1005, illustrated as a resistance 1005A and a power supply 1005B, using various techniques including both wired and wireless communication. One common wired communication technique uses what is known as a two-wire process control loop 1003 in which a single pair of wires is used to carry information as well as provide power to transmitter 1000. One technique for transmitting information is by controlling the current level through process control loop 1003 between 4 milliamps and 20 milliamps. The value of the current within the 4-20 milliamp range can be mapped to corresponding values of the process variable.

Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless protocols, such as radio-frequency communication techniques including WirelessHART® in accordance with IEC 62591, may also be implemented.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A pressure sensor comprising: a base having at least one high-pressure contact portion; a diaphragm positioned over the base and having an external top surface facing away from the base and internal surfaces facing the base, the internal surfaces comprising a raised perimeter surrounding an interior, a raised central boss within the interior, and a raised boss arm contiguous with and extending from the raised perimeter toward the interior; wherein at least one of the raised boss arm and raised central boss are aligned with and contact a high-pressure contact portion of the base during an over-pressure event.

2. The pressure sensor of claim 1 further comprising a sensing element coupled to the diaphragm and providing an output based on changes in the diaphragm.

3. The pressure sensor of claim 1 wherein the raised boss arm has an end in the interior that separated from other raised features.

4. The pressure sensor of claim 1 wherein the raised boss arm is contiguous with the perimeter at a first end of the raised boss arm and is contiguous with another raised feature at a second end of the raised boss arm.

5. The pressure sensor of claim 4 wherein the raised feature that the second end of the boss arm is contiguous with a second portion of the perimeter.

6. The pressure sensor of claim 5 wherein the boss arm comprises at least one turn between the first end and the second end of the boss arm.

7. The pressure sensor of claim 4 wherein the raised feature that the second end of the boss arm is contiguous with is the raised central boss.

8. The pressure sensor of claim 7 wherein the boss arm comprises at least one turn between the first end and the second end.

9. The pressure sensor of claim 4 wherein the raised feature that the second end of the boss arm is contiguous with is a second boss arm that is contiguous with and extends from a second portion of the raised perimeter.

* * * * *